United States Patent
Cook et al.

(10) Patent No.: US 6,845,755 B2
(45) Date of Patent: Jan. 25, 2005

(54) REGULATED LINEAR PURGE SOLENOID VALVE

(75) Inventors: John Edward Cook, Chatham (CA); Murray F. Busato, Chatham (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 09/957,615

(22) Filed: Sep. 21, 2001

(65) Prior Publication Data

US 2002/0011241 A1 Jan. 31, 2002

Related U.S. Application Data

(62) Division of application No. 08/900,977, filed on Jul. 25, 1997, now Pat. No. 6,681,746.

(51) Int. Cl.[7] ............................................. F02M 37/00
(52) U.S. Cl. .................... 123/458; 123/516; 251/129.15
(58) Field of Search ................................. 123/458, 520, 123/519, 518, 521, 516; 251/129.15, 129.08; 137/516.29

(56) References Cited

U.S. PATENT DOCUMENTS

| 4,002,318 A | * | 1/1977 | Koch ..................... 251/129.08 |
| 4,362,185 A | * | 12/1982 | Kadner .................. 137/516.29 |
| 5,538,220 A | * | 7/1996 | LaMarca ............... 251/129.15 |
| 5,649,687 A | * | 7/1997 | Rosas et al. .......... 251/129.15 |
| 5,970,958 A | * | 10/1999 | DeLand et al. ............. 123/520 |
| 6,050,245 A | * | 4/2000 | Cook et al. .................. 123/520 |

* cited by examiner

Primary Examiner—Carl S. Miller

(57) ABSTRACT

A pressure regulator is associated with a solenoid-operated valve that is operated by a pulse waveform at a fundamental frequency substantially greater than the frequency response of the valve mechanism. This substantially attenuates solenoid pulsations and applies a predetermined pressure differential across the valve mechanism to accomplish improved flow control accuracy. The invention is especially advantageous for purging fuel vapor to an intake manifold of an internal combustion engine of an automotive vehicle.

19 Claims, 7 Drawing Sheets

REGULATED LINEAR PURGE SOLENOID VALVE

This is a divisional application of application Ser. No. 08/900,977, filed on Jul. 25, 1997, now U.S. Pat. No. 6,681,746 the disclosure of which is incorporated by reference in its entirety herein.

FIELD OF THE INVENTION

This invention relates generally to emission control valves for automotive vehicles. In one specific aspect, the invention relates to solenoid-operated fluid valves for purging volatile fuel vapors from fuel tanks and vapor storage canisters to internal combustion engines that power such vehicles.

BACKGROUND OF THE INVENTION

A known on-board evaporative emission control system comprises a vapor collection canister that collects volatile fuel vapors generated in the headspace of the fuel tank by the volatilization of liquid fuel in the tank and a canister purge solenoid (CPS) valve for periodically purging collected vapors to an intake manifold of the engine. The CPS valve comprises a solenoid actuator that is under the control of a microprocessor-based engine management system.

During conditions conducive to purging as determined by the engine management system on the basis of various inputs to it, evaporative emission space that is cooperatively defined by the tank headspace and the canister is purged to the engine intake manifold through the CPS valve, which is fluid-connected between the canister and the engine intake manifold. The CPS valve is opened by a signal from the engine management computer in an amount that allows intake manifold vacuum to draw volatile fuel vapors from the canister for entrainment with the combustible mixture passing into the engine's combustion chamber space at a rate consistent with engine operation to provide both acceptable vehicle driveability and an acceptable level of exhaust emissions.

A known CPS valve comprises a movable valve element that is resiliently biased by a compression spring against a valve seat to close the valve to flow when no electric current is being delivered to the solenoid. As electric current begins to be increasingly applied to the solenoid, increasing electromagnetic force acts in a sense tending to unseat the valve element and thereby open the valve to fluid flow. This electromagnetic force must overcome various forces acting on the mechanical mechanism before the valve element can begin to unseat, including overcoming both whatever static friction (stiction) is present between the valve element and the seat, as well as the opposing spring bias force. Once the valve element has unseated, the valve element/valve seat geometry also plays a role in defining the functional relationship of fluid flow rate through the valve to electric current supplied to the solenoid coil. Furthermore, the extent to which a given valve possesses hysteresis will also be reflected in the functional relationship.

When the valve element comprises a tapered pintle that is selectively positioned axially within a circular orifice which is circumscribed by the valve seat, a well defined flow rate vs. pintle position characteristic can be obtained. However, certain geometric factors present at the valve element/valve seat interface may prevent this characteristic from becoming effective until the valve element has unseated a certain minimum distance from the valve seat. Accordingly, each graph plot of fluid flow rate through the valve vs. electric current supplied to the solenoid coil may be considered to comprise distinct spans: a short initial span that occurs between valve closed position and a certain minimum valve opening; and a more extensive subsequent span that occurs beyond a certain minimum valve opening.

One specific type of CPS valve comprises a linear solenoid and a linear compression spring that is increasingly compressed as the valve increasingly opens. It is sometimes referred to as a linear solenoid purge valve, or LSPV for short. Such a valve can provide certain desirable characteristics for flow control. By itself a linear solenoid possesses a force vs. electric current characteristic that is basically linear over a certain range of current. When a linear solenoid is incorporated in an electromechanical device, such as a valve, the overall electromechanical mechanism possesses an output vs. electric current characteristic that is a function of not just the solenoid, but also the mechanical mechanism, such as a valve mechanism, to which the solenoid force is applied. As a consequence then, the output vs. electric current characteristic of the overall device is somewhat modified from that of the linear solenoid alone.

While a CPS valve that incorporates both a linear solenoid and a tapered pintle valve element which is selectively positionable axially within a circular orifice that is circumscribed by the valve seat can exhibit a desired fluid flow rate vs. pintle position characteristic, such characteristic may not become effective until after the pintle has opened a certain minimum amount because of geometric factors at the pintle/seat interface, as noted earlier. Accordingly, each graph plot of fluid flow rate through the valve vs. electric current applied to the solenoid coil may be considered to comprise the spans referred to above, namely, a short initial span that occurs between valve closed position and a certain minimum valve opening, and a more extensive subsequent span that occurs beyond a certain minimum valve opening.

Generally speaking, a linear solenoid purge valve may be graphically characterized by a series of graph plots of fluid flow rate vs. electric current, each of which is correlated to a particular pressure differential across the valve. Each graph plot may be characterized by the aforementioned short initial span and the more extensive subsequent span. Within the latter span of each graph plot, one especially desirable attribute is that a substantially constant relationship between incremental change in an electric control current applied to the solenoid and incremental change in fluid flow rate through the valve may be obtained by appropriate design of the valve element/valve seat interface geometry. Within the former span, incremental change in fluid flow rate through the valve may however bear a substantially different relationship to incremental change in an electric control current applied to the solenoid.

In one such linear solenoid purge valve, a certain minimum electric current is required before the valve begins to open. For a given pressure differential across the valve, a corresponding graph plot of fluid flow rate vs. electric current may be described as comprising a relatively short initial span where a small incremental change in electric current will result in an incremental change in flow that is much different from the incremental change that occurs over an ensuing span where the valve has opened beyond a certain minimum opening and incremental change in flow through the valve bears a substantially constant relationship to incremental change in electric current.

Electric current to the solenoid coil of any solenoid-operated device can be delivered in various ways. One known way is by applying a pulse width modulated D.C. voltage across the solenoid coil. In choosing the pulse frequency of the applied voltage, consideration may be given to the frequency response characteristic of the combined solenoid and mechanical mechanism operated by the solenoid. If a pulse frequency that is well within the frequency response range of the combined solenoid and mechanism is used, the mechanism will faithfully track the pulse width signal. On the other hand, if a pulse frequency that is well beyond the frequency response range of the combined solenoid and mechanical mechanism is used, the mechanism will be positioned according to the time average of the applied voltage pulses. The latter technique may be preferred over the former because the mechanical mechanism will not reciprocate at the higher frequency pulse width modulated waveform, but rather will assume a position corresponding to the time averaged current flow in the solenoid coil. Under the former technique, the mechanism could, by contrast, experience significant reciprocation as it tracks the lower frequency waveform, and that might create unacceptable characteristics. In the case of a CPS valve, such characteristics may include undesirable pulsations in the purge flow and objectionable noise caused by repeated impacting of the valve element with the valve seat and/or a limit stop that limits maximum valve travel. Such a valve may experience unacceptable variation in the start-to-flow duty cycle.

In order to address the pulsation issue, it is known to associate a mechanical pressure regulator with a CPS valve. The pressure regulator mechanically damps the purge flow pulses, but does not address the root cause, which is due to the pulsating solenoid.

Accordingly, a need exists for further improvement in certain aspects of pulse-operated emission control valves such as CPS valves because such valves may be required to perform under diverse vehicle operating conditions. For a CPS valve, purging of volatile fuel vapor to the intake manifold when the engine is idling may be quite difficult to accurately control.

SUMMARY OF THE INVENTION

One general aspect of the invention relates to an electric-operated pressure-regulated fluid flow control valve comprising a valve mechanism that is positioned within a valve body by an electric control signal to control fluid flow through the valve body and that has a frequency response characteristic which renders the valve mechanism incapable of faithfully tracking the fundamental frequency of an electric control signal whose fundamental frequency is greater than a predetermined frequency that, when applied in control of the valve mechanism, positions the valve mechanism to a position corresponding to a most recent time average of the electric control signal free of any significant pulsing of the valve mechanism, and a pressure regulator comprising a flow path having an entrance through which fluid flow that has passed through the valve mechanism enters the pressure regulator flow path and an exit from which fluid flow that has entered the pressure regulator flow path exits the pressure regulator flow path, the pressure regulator comprising a pressure regulating mechanism that regulates the pressure at the entrance of the pressure regulator flow path to a pressure that is essentially independent of pressure at the exit of the pressure regulator flow path.

Another general aspect relates to an electric-operated pressure-regulated fuel vapor purge valve for purging fuel vapor from a fuel tank to an intake manifold of an internal combustion engine comprising a valve mechanism that is positioned within a valve body by an electric control signal to control flow through the valve body and that has a frequency response characteristic which renders the valve mechanism incapable of faithfully tracking the fundamental frequency of an electric control signal whose fundamental frequency is greater than a predetermined frequency that, when applied in control of the valve mechanism, positions the valve mechanism to a position corresponding to a most recent time average of the electric control signal free of any significant pulsing of the valve mechanism, and a pressure regulator comprising a flow path having an entrance through which flow that has passed through the valve mechanism enters the pressure regulator flow path and an exit for communicating the pressure regulator flow path to an engine intake manifold, the pressure regulator comprising a pressure regulating mechanism that regulates the pressure at the entrance of the pressure regulator flow path to a pressure that is essentially independent of intake manifold vacuum.

A further aspect relates to an LSPV, including a pressure regulator, that is believed to provide further improvements in purge flow control accuracy over a substantial range of valve operation and under diverse operating conditions.

A still further aspect relates to the provision of certain constructional features in a pressure regulator that, in association with a CPS valve, are believed to provide improved purge flow control accuracy by significantly attenuating the influence of variations in pressure differential that would otherwise produce variations in the purge for a given valve opening.

The foregoing, along with additional features, and other advantages and benefits of the invention, will be seen in the ensuing description and claims which are accompanied by drawings. The drawings disclose a preferred embodiment of the invention according to the best mode contemplated at this time for carrying out the invention.

DESCRIPTION OF THE PREFERRED EMBODIMENT

Figure 1:
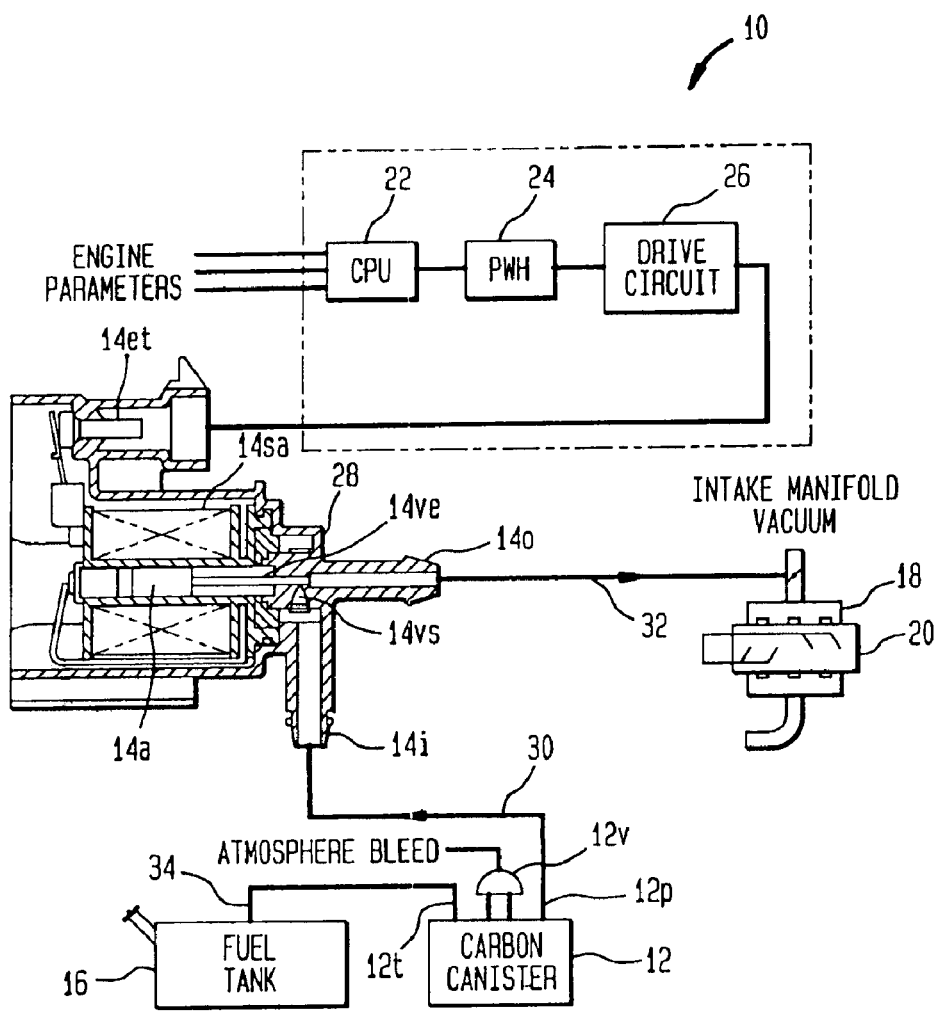
FIG. 1 is a schematic diagram of an on-board evaporative emission control system, including an enlarged longitudinal cross-sectional view through a canister purge solenoid valve.

FIG. 1 shows an evaporative emission control system 10 of a motor vehicle comprising a vapor collection canister (carbon canister) 12 and a canister purge solenoid (CPS) valve 14 connected in series between a fuel tank 16 and an intake manifold 18 of an internal combustion engine 20 in a known fashion. An engine management computer 22 supplies a valve control signal as an input to a pulse width modulation (PWM) circuit 24 to create a pulse width modulated signal which is amplified by a drive circuit 26 and applied to electric terminals 14et of valve 14.

Valve 14 comprises a housing 28 having an inlet port 14i that is fluid-coupled via a conduit 30 with a purge port 12p of canister 12 and an outlet port 14o that is fluid-coupled via a conduit 32 with intake manifold 18. A conduit 34 communicates a canister tank port 12t to headspace of fuel tank 16. An operating mechanism comprising a solenoid actuator 14sa is disposed within housing 28 for opening and closing an internal passage that extends between ports 14i and 14o. The mechanism includes a bias spring 14bs that acts to urge a valve element 14ve closed against a valve seat 14vs for closing the internal passage to flow. When the solenoid actuator is progressively energized by engine management computer 22, electromagnetic force is applied to an armature 14a in opposition to the bias spring force to unseat valve element 14ve from valve seat 14vs and thus open the internal passage so that flow can occur between ports 26 and 30.

Canister 12 is also seen to comprise a vent port 12v via which the evaporative emission space where the fuel vapors are contained is vented to atmosphere. Such venting may be via an atmospheric vent valve (not shown) that is operated closed at certain times, such as during OBDII testing.

Figure 2:
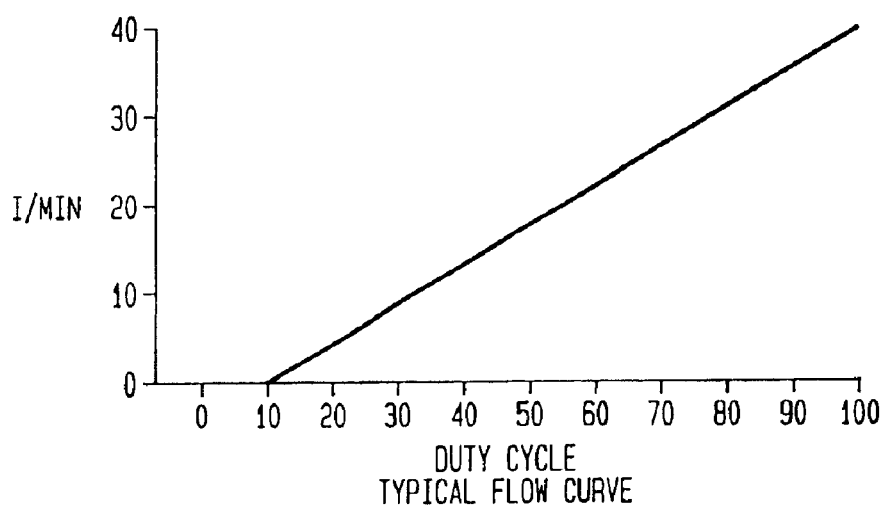
FIG. 2 is a representative graph plot related to FIG. 1.

FIG. 2 depicts a representative control characteristic for valve 14 wherein fluid flow rate through the valve is related to the duty cycle of a pulse width modulated voltage that is applied across terminals 14et. A certain minimum duty cycle, about 10% in the example, is required before the valve begins to open. As the duty cycle increases beyond 10%, the flow rate bears a generally straight line relationship to duty cycle. At 100% duty cycle a constant D.C. voltage is applied across terminals 14et. The frequency of the pulse waveform that accomplishes this type of operation is relatively low, a representative frequency being within a range from about 5 Hz to about 20 Hz, but possibly as high as about 50 Hz. For valve mechanisms whose frequency response extends beyond such a range, the mechanism will experience significant reciprocal motion as it follows the pulse waveform.

Because the valve is not pressure-regulated, flow rate will also be a function of the pressure differential across the valve ports. Temperature and voltage variations may also influence the relationship.

Figure 3:
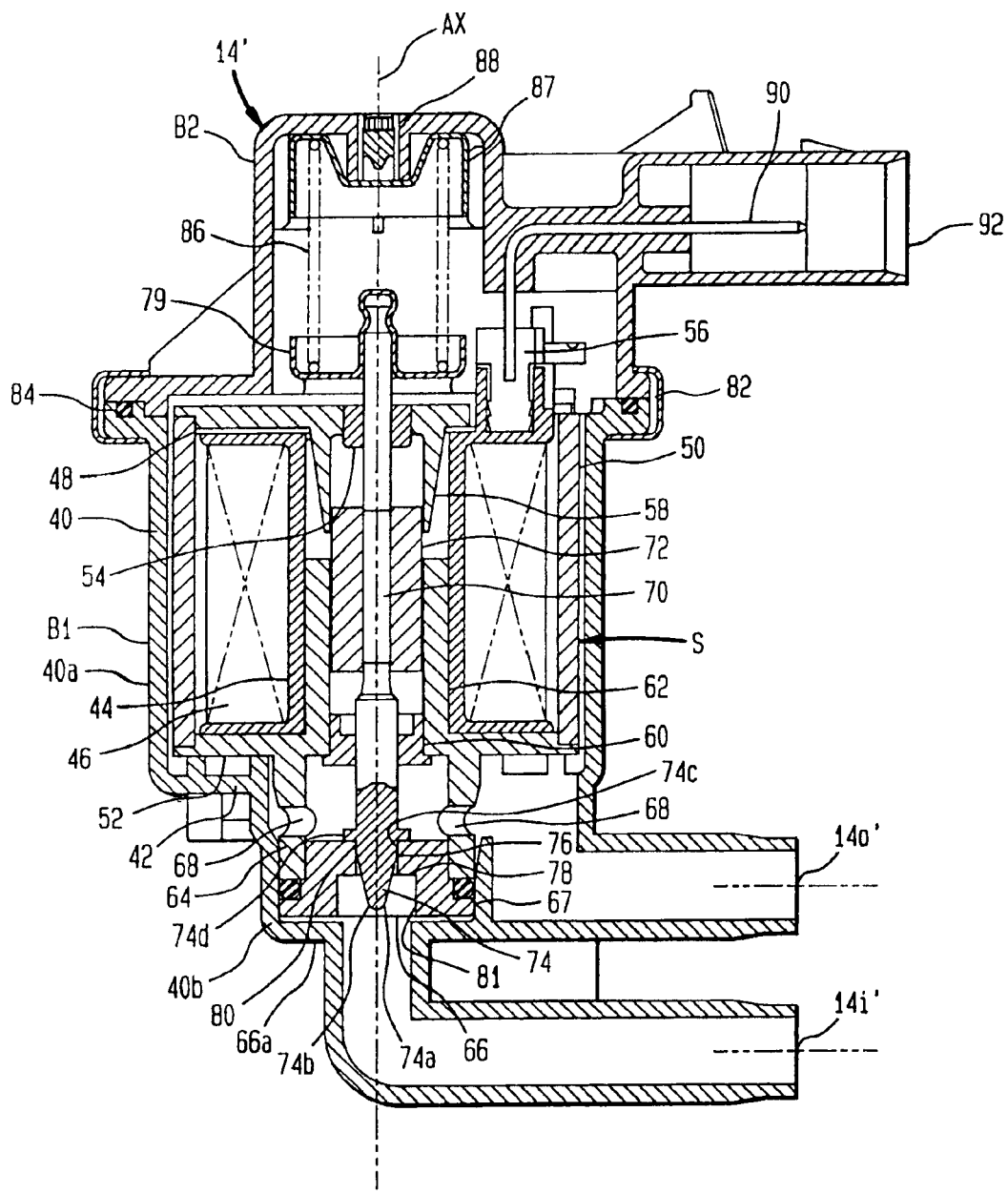
FIG. 3 is a longitudinal cross-sectional view through another canister purge solenoid valve.

It is known that the use of a linear solenoid can improve control accuracy, and FIG. 3 shows an example of a linear solenoid purge valve 14', certain parts of which correspond to parts of valve 14 already mentioned, and they will be designated by corresponding primed reference numerals.

Valve 14' comprises a two-piece body B1, B2 having an inlet port 14i' and an outlet port 14o'. Valve 14' has a longitudinal axis AX, and body piece B1 comprises a cylindrical side wall 40 that is coaxial with axis AX and that is open at its upper axial end where it is in assembly with body piece B2. Side wall 40 comprises upper and lower side wall-portions 40A, 40B joined by a shoulder 42; the former side wall portion is fully cylindrical while the latter is cylindrical except in the region where it is radially intercepted by port 14o'. Port 14i' is in the shape of an elbow that extends from the lower axial end of side wall 40. By itself, body piece B1 is enclosed except for its open upper axial end and the two ports 14o' and 14i'.

A linear solenoid S is disposed in body piece B1, having been introduced through the open upper end of body piece B1 during fabrication of the valve. The solenoid comprises a bobbin 44, magnet wire wound on bobbin 44 to form a bobbin-mounted electromagnetic coil 46, and stator structure associated with the bobbin-coil. This stator structure comprises an upper stator end piece 48 disposed at the upper end of the bobbin-mounted coil, a cylindrical side stator piece 50 disposed circumferentially around the outside of the bobbin-mounted coil, and a lower stator end piece 52 disposed at the lower end of the bobbin-mounted coil.

Upper stator end piece 48 includes a flat circular disk portion whose outer perimeter fits to the upper end of side piece 50 and that contains a hole into which a bushing 54 is pressed so as to be coaxial with axis AX. The disk portion also contains another hole to allow for upward passage of a pair of bobbin-mounted electrical terminals 56 to which ends of magnet wire 46 are joined. Piece 48 further comprises a cylindrical neck 58 that extends downward from the disk portion a certain distance into a central through-hole in bobbin 44 that is co-axial with axis AX. The inner surface of neck 58 is cylindrical while its outer surface is frusto-conical so as to provide a radial thickness that has a progressively diminishing taper as the neck extends into the bobbin through-hole.

Lower stator end piece 52 includes a flat circular disk portion whose outer perimeter fits to the lower end of side piece 50 and that contains a hole into which a bushing 60 is pressed so as to be coaxial with axis AX. Piece 52 further comprises an upper cylindrical neck 62 that extends upwardly from the disk portion a certain distance into the central through-hole in bobbin 44 and that is co-axial with axis AX. Neck 62 has a uniform radial thickness. Piece 52 still further comprises a lower cylindrical neck 64 that extends downward from the disk portion a certain distance so that its lowermost end fits closely within lower side wall portion 40B. A valve seat element 66 is necked to press-fit into the open lower end of neck 64 and is sealed to the inside of wall portion 40B by an O-ring 67. Above the lowermost end that fits to side wall 40, neck 64 contains several through-holes 68 that provide for communication between port 14o' and the space disposed above seat element 66 and bounded by neck 64. Side wall 40 allows this communication by not restricting through-holes 68.

Bushings 54 and 60 serve to guide a valve shaft 70 for linear travel motion along axis AX. A central region of shaft 70 is slightly enlarged for press-fit of a tubular armature 72 thereto. The lower end of shaft 70 comprises a valve 74 that coacts with valve seat element 66. Valve 74 comprises a head, integrally formed with shaft 70 and having the general shape of a tapered pintle, comprising a rounded tip 74A, a frustoconical tapered section 74B extending from tip 74A, a grooved cylindrical section 74C extending from section 74B, and an integral back-up flange 74D that in part defines the upper axial end of the groove of section 74C. An O-ring type seal 76 of suitable fuel-resistant elastomeric material is disposed in the groove of section 74c.

Seat element 66 comprises an inwardly directed shoulder 66A that contains a portion of a through-hole that extends axially through the seat element. This portion of the through-hole comprises a straight cylindrical section 78 and a frustoconical seat surface 80 that extends from the upper end of section 78 and is open to the interior space bounded by neck 64. The remainder of the through-hole axially below section 78 is designated by the reference numeral 81.

The upper end of shaft 70 protrudes a distance above bushing 54 and is shaped to provide for attachment of a spring seat 79 thereto. With piece B2 being attached to piece B1 by a clinch ring 82 which grips confronting, mated flanges to sandwich a seal 84 between them, a helical coiled linear compression spring 86 is captured between seat 79 and another spring seat 87 that is received in a suitably shaped pocket of piece B2. A calibration screw 88 is threaded into a hole in the end wall of this pocket coaxial with axis AX, and it is externally accessible by a suitable turning tool (not shown) for setting the extent to which spring seat 87 is positioned axially relative to the pocket. Increasingly threading screw 88 into the hole increasingly moves seat 87 toward spring seat 79, increasingly compressing spring 86 in the process. Terminals 56 are also joined with terminals 90 mounted in piece B2 to form an electrical connector 92 for mating engagement with another connector (not shown) that connects to drive circuit 26.

In the valve closed position shown in FIG. 3, a rounded surface portion of seal 76 has circumferentially continuous sealing contact with seat surface 80 so that the valve closes the flow path between ports 14o' and 14i'. In this position the upper portion of armature 72 axially overlaps the air gap that exists between the upper end of neck 62 and the lower end of neck 58, but slight radial clearance exists so that armature 72 does not actually touch the necks, thereby avoiding magnetic shorting.

Generally speaking, the degree of valve opening depends on the magnitude of electric current flow through the solenoid coil 46 so that the purge flow through the valve is effectively controlled by controlling the electric current flow through the coil. As the magnitude of electric current flow progressively increases from zero, it reaches a value sufficient to break whatever stiction exists between the seated O-ring 76 and seat surface 80. At that point the valve mechanism begins to open against the opposing force of spring 86. Valve opening commences as soon as O-ring seal 76 loses contact with seat surface 80.

Depending on the specific geometric relationships that are present between the valve pintle, its O-ring seal, and the angle of the valve seat surface, a certain initial axial travel of the pintle that unseats O-ring seal 76 from seat surface 80 may have to occur before tapered section 74B can become effective by itself to set the effective flow area through the seat element through-hole. In other words, it is only after the valve has traveled more than some initial minimum travel distance that the tapered section can become effective by itself to control the area open to flow. Beyond this initial minimum, the open area progressively uniformly increases as the pintle is increasingly positioned away from the seat element.

A representative graph plot of fluid flow rate vs. electric current reveals three distinct spans: a first span where current increases without any valve opening; a second span where the valve begins to open but the tapered section 74B is not yet fully effective to control the flow by itself; and a third span where the valve has opened sufficiently to allow section 74B to alone control the flow. The second span may be characterized by a relationship wherein a small incremental change in average electric current in solenoid S causes an incremental change in fluid flow rate that is substantially different from the incremental change results when the valve operates instead within the third span.

Coil 46 of solenoid S is connected across a source of D.C. voltage pulses, such as a pulse-width modulator circuit operating at a selected frequency. Electric current flow to the coil may be controlled by a solid-state driver in accordance with a control output signal from an engine management computer, and the circuit may include a feedback loop for feeding back a signal representative of electric current flow through the solenoid coil so as to endow the control with the ability to compensate for certain environmentally induced changes that could otherwise impair control accuracy. For example, the feedback loop can automatically regulate the current flow through coil 46 such that the influences of changes in ambient conditions, such as temperature and D.C. supply voltage to the circuit, are essentially negated, thereby enabling the valve to operate to a desired position commanded by the circuit substantially free of such influences.

Figure 4:
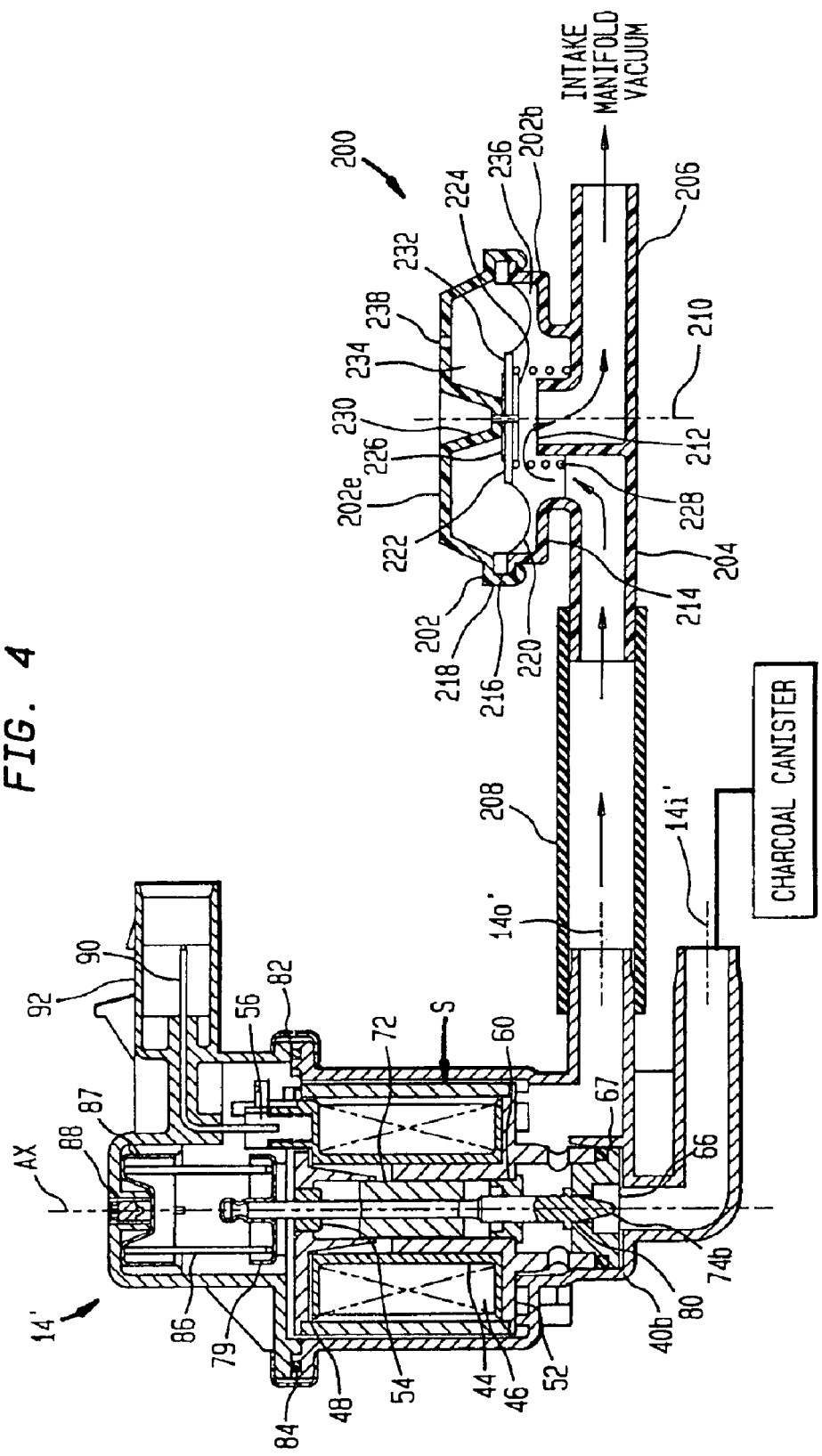
FIG. 4 is a longitudinal cross-sectional view through the canister purge solenoid valve of FIG. 3 and an associated pressure regulator in accordance with the inventive principles.

FIG. 4 shows a mechanical pressure regulator 200 operatively associated with valve 14'. Pressure regulator 200 comprises a two-piece body 202 having a base 202b and a cover 202c, both of which are fabricated from suitable material, such as fuel tolerant injection molded plastic. Base 202b comprises an inlet port 204 and an outlet port 206 each of which is in the form of a nipple. A conduit 208 fluid connects port 204 with outlet port 14o' of valve 14', and outlet port 206 is fluid connected with engine intake manifold by another conduit that is not specifically illustrated in the Fig.

The nipple forming outlet port 206 comprises a walled conduit having a radial segment that extends inwardly of body 202 to form an axial segment that is coaxial with an axis 210 of pressure regulator 200. This walled axial conduit segment terminates as a circular rim forming a seal seat 212. Base 202b further comprises a cylindrical walled cup having a circular annular radial shoulder 214. This cup terminates in a circular rim 216 that is coaxial with axis 210.

Cover 202c has a generally circular shape whose outer periphery contains one or more catches 218 that attach the cover to the otherwise open end of the cup of base 202b at rim 216 by snapping over a lip of the rim as shown. The beaded outer circular perimeter of an impermeable flexible member 220 is held captured between the outer margin of cover 202c and rim 216 in a sealed manner. Centered with member 220 coaxial with axis 210 is a rigid circular disk 222. Secured centrally to disk 222 in confrontational juxtaposition to rim 216 is a circular seal element 224. In the illustrated embodiment, element 224 is secured to disk 222 by being molded onto the disk, with a portion of the molded material passing from the element, through a small hole in the center of the disk, to create an interlocking circular formation 226 on the opposite face of the disk.

It can be seen that the outer margin of disk 222 contains an annular area free of molded material. One end of a helical coiled compression spring 228 bears against this annular area. The opposite end of the spring bears against a wall of base 202b that extends circumferentially partially around the axial segment of the outlet port nipple below rim 212.

Cover 202c is formed with a central depression 230, and in the condition shown by FIG. 4, spring 228 is seen forcing disk 222 away from rim 212 such that the flat end surface of formation 226 is biased against the flat end surface of depression 230.

The assembled parts 220, 222, 224 form a fluid impermeable wall 232 that divides the interior of body 202 into first and second chamber spaces 234, 236. In the position shown by the Fig., chamber 236 provides free communication between ports 204 and 206. The flow path thus provided is depicted by the arrows which represent purge flow from valve 14', through inlet port 202, through chamber space 236, and through outlet port 204 to the engine intake manifold. Chamber space 234 is communicated directly to atmosphere through an atmospheric vent orifice 238 through the wall of cover 202c.

Pressure regulator 200 operates in the following manner. For purposes of explanation, assume that it is in the position illustrated in the Fig., that equal pneumatic pressures exist in the two chamber spaces 234, 236, and that valve 14' is open. The creation of increasing intake manifold vacuum in chamber space 236 will begin to create an increasing pressure differential on wall 232. At a certain differential, the bias force of spring begins to be overcome, and the central region of wall 232 begins moving toward rim 212. Atmospheric pressure is maintained in chamber space 234 because air is drawn through vent orifice 238 as wall 232 moves toward rim 212. When the vacuum has increased to a certain larger magnitude, seal element 224 will be sufficiently close to rim 212 to create a restriction of the purge flow. The seal element may actually close on rim 212, albeit only momentarily. Such restriction or closure, tends to reduce the pneumatic pressure differential acting on wall 232 so that spring 228 then tends to move the central region of the wall away from rim 212. Atmospheric pressure is maintained in chamber space 234 because air is forced out through vent orifice 238.

The overall effect is such that sealing element 224 will assume an average position that causes the vacuum in chamber space 236 to be regulated to a predetermined magnitude that is substantially independent of the magnitude of intake manifold vacuum. Hence, with the tank headspace at atmospheric pressure, flow through the valve is essentially unaffected by change in intake manifold vacuum because a substantially constant pressure differential is maintained across valve 14'. Now as valve 14' operates to different positions as commanded by the signal applied to solenoid S, the commanded positions will produce substantially the correspondingly intended purge flow rate, substantially free of variation in intake manifold vacuum. Because flexible member 220 is provided with a convolution, it imposes no restriction of the movement of the central region of the movable wall relative to the open end of the walled axial conduit segment that contains rim 212.

Thus, in distinction to prior uses of pressure regulators in conjunction with pulsating purge valves, the disclosed embodiment does not utilize a pressure regulator for the purpose of dampening purge flow pulsations. Rather, the creation of a predetermined pressure differential acting across valve 14' enables a given command signal to directly provide the intended flow rate, free of manifold vacuum variations. It is believed that this can eliminate the need for the engine management computer to include a map for processing an input representing intake manifold vacuum when it calculates what the command signal to the solenoid coil of the valve should be.

Figure 5:
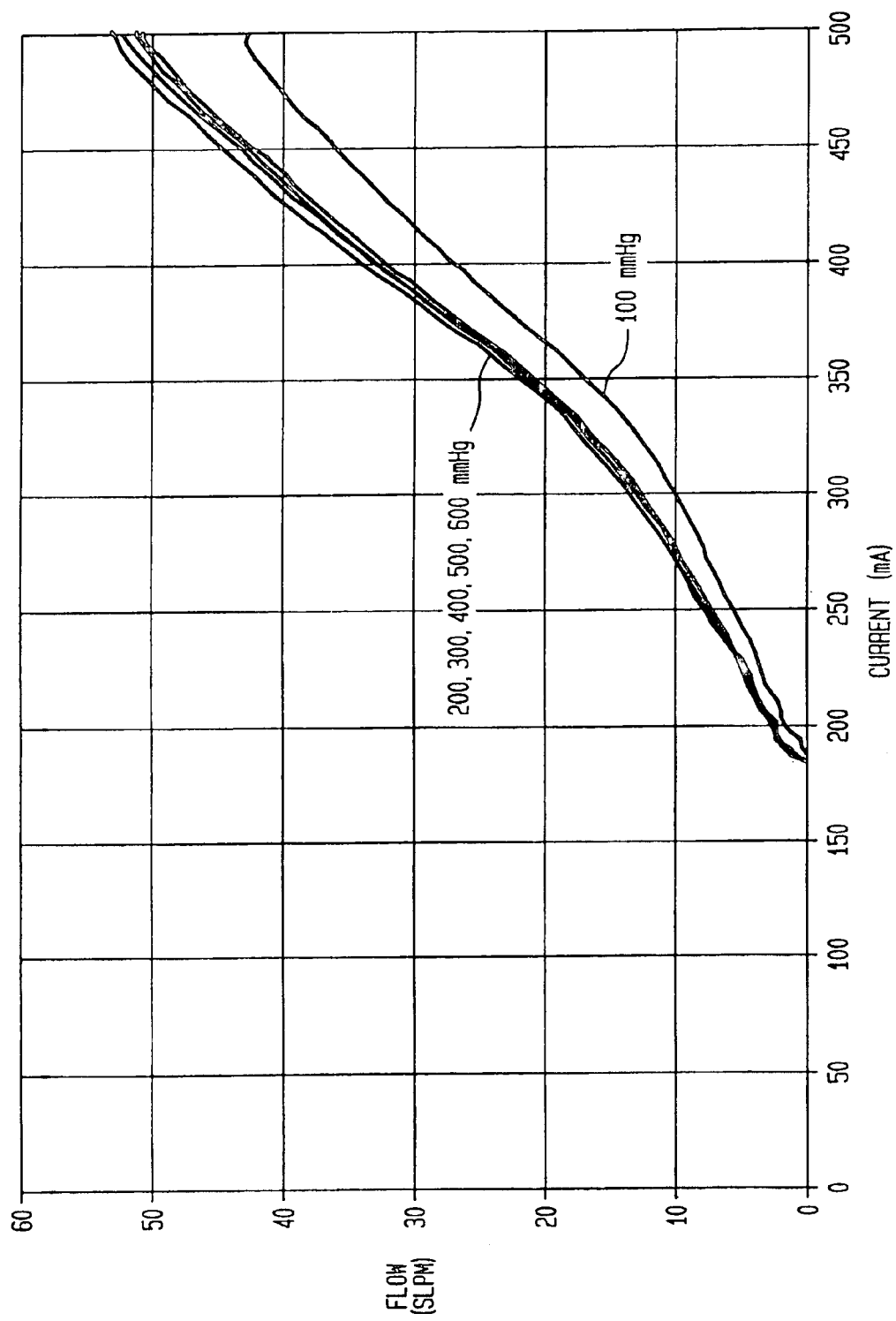
FIG. 5 is a series of graph plots useful in explaining the inventive principles in relation to FIG. 4.

FIG. 5 shows a series of representative graph plots of purge flow rate through valve 14' vs. time-averaged D.C. current flow in the solenoid coil. Each graph plot corresponds to a different value of intake manifold vacuum as indicated in FIG. 5, but the important effect of pressure regulator 200 can be seen by the substantial congruence of graph plots for 200, 300, 400, 500, and 600 mm Hg intake manifold vacuum. In the examples of FIG. 5, purge flow commences at about 183 milliamps current for the substantially congruent plots.

Figure 6:
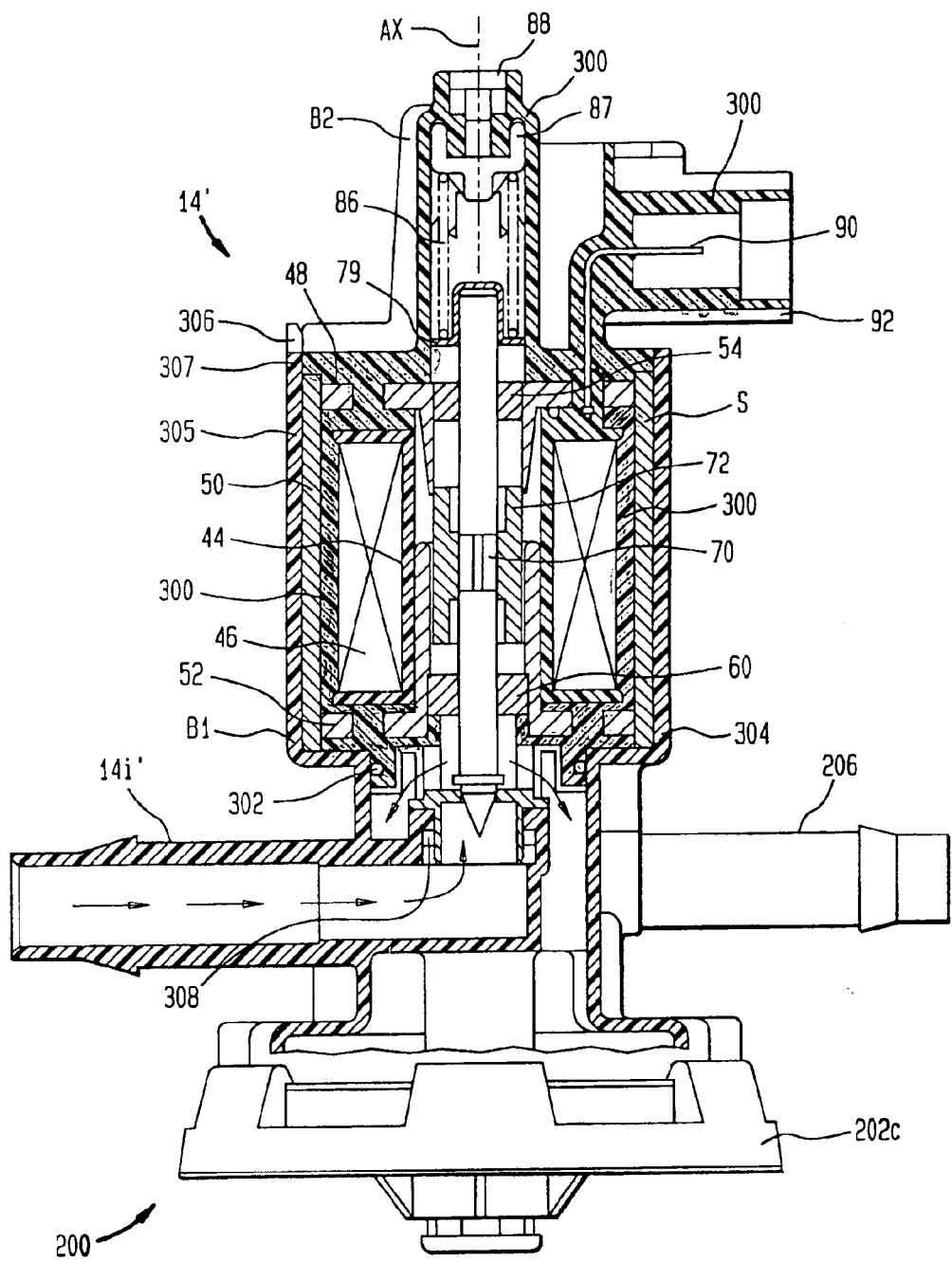
FIG. 6 is a longitudinal view, partly in cross-section, through another embodiment in accordance with the inventive principles.
Figure 7:
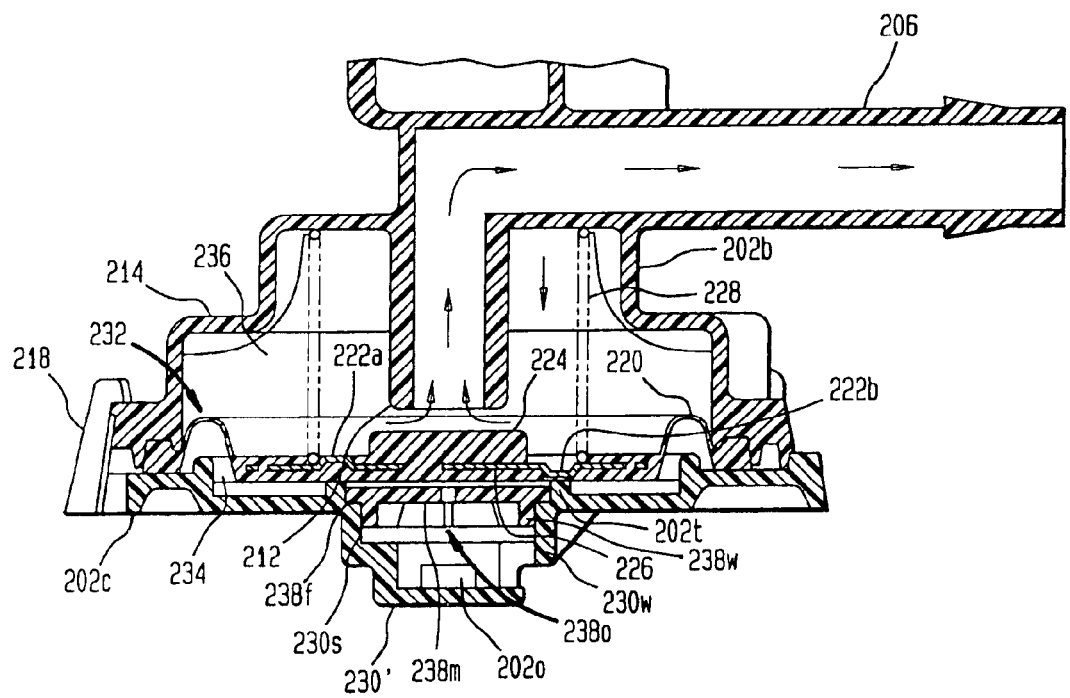
FIG. 7 is a longitudinal view of the embodiment of FIG. 6, but having a different portion in cross-section.

FIGS. 6 and 7 illustrate another embodiment in which an LSPV and a pressure regulator are integrated into a single assembly. Like reference numerals from the preceding Figs. are used to identify like parts, although from comparison of it can be seen that certain parts differ in certain details of construction. FIGS. 6 and 7 show that pressure regulator 200 has been integrated into the lower end of LSPV 14'. The nipples that formed valve outlet port 14o' and regulator inlet port 208 have been eliminated. The portion of the flow path downstream of the valve pintle is communicated to chamber space 236 directly within the body of the assembly.

Flexible member 220, seal element 224, and formation 226 are embodied as a single part that is created by insert molding onto disk 222. The central region of cover 202c comprises a tower 230' which is somewhat different from the depression 230 of the earlier embodiment. Tower 230' comprises a generally cylindrical wall 230w having a shoulder 230s. An orifice member 238m is secured in place on cover 202c by a short axial wall 238w that is press-fit to a portion of wall 230w. A circular radial flange 238f at one axial end of wall 238w is disposed against shoulder 230s to axially locate orifice member 238m on cover 202c.

One face of disk 222 comprises several circumferentially spaced formations 222a that are arranged in a circular pattern to center one axial end of spring 228 against disk 222. The opposite disk face comprises several circumferentially spaced formations 222b also arranged in a circular formation. Proximate shoulder 230s, cover 202c comprises a circular ridge 202r against which formations 222b bear when spring 228 is biasing seal element 224 maximally away from rim 212.

Orifice member 238m contains a central through-orifice 238o that corresponds to orifice 238 for communicating chamber space 234 to atmosphere through the interior of tower 230' to openings 202o that extend through the wall of the tower. Pressure regulator 200 and valve 14' of the FIGS. 6 and 7 embodiment function in the same manner as described above for the earlier embodiment.

While the solenoid S shown in FIG. 6 functions in the same manner as the solenoid shown in FIGS. 3 and 4, it differs in certain constructional respects. The coil-containing bobbin 44, 46 and stator parts 48 and 52 are encased in an overmolded cap 300 to form an assemblage that also includes the body part B2 as part of the overmolding. Thus, the overmolding includes features forming the shell of connector 92 and accomodations for acceptance of spring 86 and its associated adjustment mechanism. Thus, the overmolding includes features forming the shell of connector 92 and accommodations for acceptance of spring 86 and its associated adjustment mechanism.

These parts that are to be overmolded are placed in a suitably shaped mold cavity in a machine that forms the overmold around them. As overmold material flows, it passes through holes in flanges of stator parts 48 and 52, covering the end surfaces and outer edges of the bobbin flanges and covering the exterior of coil 46. The two stator parts are sealed relative to the central interior through-hole of bobbin 44 such that the overmold material does not intrude into that through-hole. Upon curing of the overmold material, the overmold has a final shape as shown, including a short neck at one end. The neck contains a circular groove for acceptance of an O-ring 302 that, when the overmolded assemblage is assembled into the valve during the fabrication process, serves to seal that end of the overmold to the wall of a single molded plastic part 304 in which valve body part B1, base 202b, and the nipples forming inlet port 14i' and exit 206 are integrated.

In the particular embodiment of FIG. 6, stator part 50 is not part of the overmold assemblage. Rather, it is a separate tubular walled cylinder that is placed inside a main cylindrical wall 305 of body part B1 via the open upper end thereof, as seen in FIG. 6, and it is axially captured therein by the overmold assemblage as the latter is inserted to assembled position within space bounded by wall 305.

The overmold assemblage is retained in final assembled position shown in FIG. 6 by several catches 306 on the wall of part 304 that snap over radial protrusions 307 extending from the overmold. Prior to insertion of the overmold assemblage into the space bounded by wall 305, various internal parts such as 54, 60, 70, 72, 79, 86, 87, 88 are assembled into the overmold assemblage. Also, the valve seat element 66 is assembled to part 304, that element having a cylindrical wall fitted in a sealed manner by an O-ring 308 to the open internal end (co-axial with axis AX) of the nipple that forms inlet port 14*i*'. Above its transverse wall that contains the valve through-hole controlled by valve 74, the valve seat element contains an apertured cylindrical wall that provides for vapor flow that has passed through the seat element through-hole to flow to an internal space of part 304 and thence enter regulator chamber space 236. The vapor flow path is indicated by the unnumbered arrows in FIGS. 6 and 7.

Embodiments utilizing the inventive principles may be constructed in diverse ways. Because automotive electronic technology commonly employs electronic processors, the development of the electric control signal for the solenoid may be accomplished by utilizing conventional software programming techniques to develop the desired waveform or waveforms for any specific control strategy.

While the present invention has been described with reference to a preferred embodiment as currently contemplated, it should be understood that the invention is not intended to be limited to that embodiment. Accordingly, the invention is intended to encompass various modifications and arrangements that are within the scope of the claims.

What is claimed is:

1. A purge assembly having a valve driven by a solenoid, the assembly comprising:
    a calibration spring;
    a coil which, when energized, drives the valve along an axis;
    a pin extending along the axis and through the coil between first and second ends, the first end of the pin being biased by the calibration spring, and the second end of the pin being secured to the valve; and
    a cap, the cap defining a first chamber and a second chamber axially spaced from the first chamber;
    wherein the cap is overmolded, the coil is encapsulated in the first chamber, the calibration spring is encapsulated in the second chamber, and a fastening feature is disposed proximate the cap.

2. The assembly according to claim 1, further comprising:
    an electrical connector, the connector molded as a portion of the cap.

3. The assembly according to claim 1, wherein the assembly is adapted to be coupled by snapping into a discrete lower body.

4. The assembly according to claim 1, wherein the assembly is adapted to be coupled by snapping into an intake manifold.

5. A purge assembly having a valve driven by a solenoid, the assembly comprising:
    a calibration feature;
    a bobbin extending along an axis between first and second flanges;
    a pin extending along the axis through the bobbin between first and second ends, the first end of the pin being biased by the calibration feature, and the second end of the pin being connected to the valve;
    a wire wound around the bobbin between the first and second flanges;
    at least one terminal electrically connected to the wire; and
    an overmolded cap, the overmolded cap defining a first chamber and a second chamber axially spaced from the first chamber, the overmolded cap generally encapsulating the wire and contiguously engaging the first and second flanges in the first chamber, the overmolded cap generally encapsulating the calibration feature in the second chamber, the overmolded cap including a connector body formation partially encapsulating the at least one terminal, and a fastening feature proximate the cap.

6. The assembly according to claim 5, further comprising:
    the pin being displaceable with respect to the bobbin when an electric current flows through the wire;
    wherein the calibration feature comprises a pin displacement calibration feature including a resilient element biasing the pin with respect to the overmolded cap and a first locator adjusting the position of the resilient element with respect to the overmolded cap.

7. The assembly according to claim 6, wherein the pin displacement calibration feature further includes a second locator connecting the resilient element with respect to the pin.

8. The assembly according to claim 6, wherein the resilient element includes a coil spring.

9. The assembly according to claim 6, wherein the first locator threadably engages the overmolded cap.

10. The assembly according to claim 5, wherein the overmolded cap further includes a locking feature adapted for releasable retaining an electrical connector with respect to the connection body formation.

11. The assembly according to claim 5, wherein the fastening feature is a snap fastening feature adapted for securing the overmolded cap to a mount.

12. The assembly according to claim 11, wherein the snap fastening feature is adapted for enabling the connection body formation to be reoriented with respect to the mount.

13. The assembly according to claim 6, further comprising:
    at least one bearing unit guiding displacement of the pin with respect to the cap;
    a stator at least partially encapsulated by the overmolded cap and magnetically connected to a magnetic field created by the electric current flowing through the wire; and
    an armature portion of the pin responsive to the magnetic field.

14. The assembly according to claim 13, wherein the resilient element includes a coil spring, the pin displacement calibration feature further includes a second locator connecting the coil spring with respect to the pin, and the first locator threadably engages the overmolded cap.

15. The assembly according to claim 14, wherein the overmolded cap further includes a locking feature adapted for releasable retaining an electrical connector with respect to the connection body formation, and wherein the fastening feature is a snap fastening feature that enables the connection body formation to be reoriented with respect to a mount having a valve seat that engages the pin to control fluid flow.

16. A method of assembling a linear solenoid purge valve component, the method comprising:
    providing a calibration feature;
    winding a wire around a bobbin, the bobbin having an axis;
    disposing a pin extended along the axis and through the bobbin between first and second ends, the first end of the pin being biased by the calibration feature, and the second end of the pin being engaged with a valve;

electrically connecting the wire to a terminal;

overmolding a cap that defines a first chamber and a second chamber axially spaced from the first chamber, that generally encapsulates the wire and bobbin in the first chamber, that generally encapsulates the calibration feature in the second chamber, and that partially encapsulates the terminal; and coupling a fastening feature of the component with a discrete lower body.

17. The method according to claim 16, further comprising:

providing a resilient element biasing a first locating member with respect to the cap;

engaging a second locating member with respect to the cap; and adjusting the second locating member with respect to the cap to vary the biasing force between the first locating member and the cap.

18. The method according to claim 16, further comprising:

providing the pin adapted for reciprocal movement with respect to the bobbin;

providing at least one bearing between the pin and the cap; and connecting the cap with a mount, the mount having a valve seat adapted for engaging the valve to control fluid flow.

19. The method according to claim 18, further comprising:

adjusting the cap to reorient a connector body formation of the cap with respect to the mount.

* * * * *